3,705,119
SPLITTING BLOCKED ISOCYANATES WITH A CARBOXYLIC ACID SALT OF CALCIUM, STRONTIUM, MAGNESIUM, OR BARIUM
Jerome F. Levy, Dresher, and John Kucsan, Philadelphia, Pa., assignors to Rohm and Haas Company, Philadelphia, Pa.
No Drawing. Filed Aug. 6, 1970, Ser. No. 61,791
Int. Cl. C08g 22/40
U.S. Cl. 260—18 TN                15 Claims

ABSTRACT OF THE DISCLOSURE

Lower reaction temperatures for "splitting" blocked isocyanates and reacting the same with active hydrogen containing compounds, as in forming polyurethanes and polyureas, particularly in coatings, are made possible by using a carboxylic acid salt of magnesium, calcium, strontium, or barium, such as of hexanoic acid, octanoic acid, naphthenic acid, or linoleic acid, as a catalyst. The acids preferably have from 3 to about 18 carbon atoms, preferably from about 5 to about 10 carbon atoms. The catalysts are much superior to or equal to tin compounds such as dibutyl-tin di-2-ethylhexoate, stannous oleate, or stannous octoate, and are less expensive. Salts such as calcium acetate, calcium stearate, and calcium oleate are ineffective.

---

This invention resides in the preparation of polyurethanes and polyureas utilizing diisocyanates, polyisocyanates, or prepolymers in which one or more of the

—N=C=O groups are blocked or inactivated through reaction with compounds which form adducts, stable at room temperature. These blocked isocyanates are commonly used in "one-component" compositions containing, in addition to the blocked isocyanate, an active hydrogen-containing compound such as a polyoxyalkylene glycol, polyols, a polyester having hydroxyl groups, a hydroxyl-containing polymer, and/or castor oil, which mixture is heated to accomplish the polymer-forming reaction. Of particular interest is the use of the present invention in the production of polyurethane coatings and coated articles.

Such one-component or "one-can formulations are well known in the art. They have been used, for example, in coating metals such as copper wire used in electrical devices, and have commonly been cured, to accomplish the polymer-forming reaction, by heating the coated article to 150° C., or even higher. A number of catalysts for accelerating the reaction have been proposed, a common, but expensive, material being dibutyl-tin di-2-ethylhexoate. The use of such a catalyst may have a two-fold purpose, one being to lower the temperature at which the unblocking or splitting takes place and the other being to accelerate the polymer-forming reaction.

One object of the invention is to provide a process of forming polymers of components including blocked diisocyanates, polyisocyanates, or prepolymers terminated with isocyanate groups, each having one or more blocked isocyanate groups, wherein new catalysts are utilized in preparing the polymers.

Another object of the invention is to lower the temperature at which blocked isocyanates react to form polymers with active hydrogen-containing materials.

Yet another object of the invention is to provide a polymerization process, a coating process, and coated articles in carrying out the foregoing objects of invention. The manner of accomplishing these and other objects will become apparent upon considering the following detailed description.

It has now been found that lower reaction temperatures for causing the reactions of blocked isocyanates to take place are made possible by including in the reaction mixture an organo-soluble carboxylic acid salt of calcium strontium, magnesium, or barium, the first two being preferred. These catalysts are particularly useful in accomplishing the unblocking of blocked isocyanates and further have been found useful in lowering the temperature at which isocyanates react with materials which have a hydroxyl group, especially a primary active hydrogen such as a primary hydroxy group. Of particular interest is the formation of polymers.

The catalyst salts must be organo-soluble. As the term is used herein, "organo-soluble" means that the material has appreciable solubility, preferably at least about 0.1% by weight, in common solvents such as ethanol, acetone, ether, methylethyl ketone, or hydrocarbons such as toluene or in the liquid reaction mixture which contains the blocked isocyanate. Salts of the specified metals with substantially any carboxylic acid, particularly the monocarboxylic acids, are encompassed in the invention provided the criterion as to organo-solubility is met. Particularly preferred are the organo-soluble salts of these metals with monocarboxylic alkenoic or alkanoic acids having from 3 to about 18, preferably about 5 to about 10 carbon atoms, representative examples being hexanoic, octanoic, decanoic, naphthenic, lauric, pentadecanoic, palmitic, and linoleic acid. Aminocarboxylic acids and hydroxycarboxylic acid salts are also useful. Examples of salts which are ineffective, possibly because of poor solubility, are calcium acetate, calcium oleate, and calcium stearate. Stannous octoate, lead octoate, stannous oleate, and dibutyl-tin di-2-ethylhexoate are effective, but the catalysts of the present invention are much superior thereto, are markedly less expensive, less hazardous, and are effective in much smaller amounts. Zinc and iron compounds are ineffective. Surprisingly, the present discovery seems to be contrary to suggestions in the literature that calcium compounds are inoperable in catalyzing the hydroxyliso- I, Chemistry, Saunders and Frisch, Interscience, pages 167, 169), at least as to a polyether triol as the hydroxyl reactant.

Substantially any isocyanate blocked with a phenol or substituted phenol, in particular those derived from diisocyanates, polyisocyanates, and prepolymers having terminal —N=C=O groups (collectively called polyisocyanates), are useful according to the present invention. Representative of diisocyanates which may be formed into adducts with suitable blocking agents are 2,4-tolylene diisocyanate, mixtures of 2,4-tolylene diisocyanate with 2,6-tolylene diisocyanate, bis(2-isocyanatoethyl) carbonate, 4,4'-diphenylmethane diisocyanate, dianisidine diisocyanate, m-xylylene diisocyanate, 1-chlorophenyl-2,4-diisocyanate, 3-3-isocyanato-methyl - 3,5,5 - trimethylcyclohexyl isocyanate, 1,6-hexamethylene diisocyanate, 4,4',4''-triphenylmethane triisocyanate, methyl cyclohexyl diisocyanate, 1,8-octamethylene diisocyanate, 1,12-dodecamethylene diisocyanate, 1,5-naphthalene diisocyanate, 2, 7-fluorene diisocyanate, 4,4''-methylene bis(cyclohexylisocyanate) and other isomers, 4,4'-biphenyl diisocynate, m-phenylene diisocyanate, p-phenylene diisocyanate, 3,3'-dimethyl-4,4'-biphenyl diisocyanate, 2-isocyanoethyl-6-isocyanatocaproate, tetrachloro-1,3-phenylene diisocyanate, 2,4,6-tribromo-1,3-phenylene diisocyanate, bis(2-isocyanatoethyl) fumarate, and prepolymers thereof, a prepolymer containing terminal —N=C=O groups prepared from two moles of 2,4-tolylene diisocyanate and one mole of poly(1,4-oxybutylene) glycol of 1600 molecular weight, dimer acid derived diisocyanate ("DDI" diisocyanate), and the like.

Other polyisocyanates which can be used in the compositions of the invention are 2,2,4-trimethylhexamethylene diisocyanate, methyl 2,6-diisocyanatocaproate, and related isocyanates, 4-methyl-1,3-diisocyanatocyclohexane, 4,4'-methylene-bis(cyclohexyl isocyanate), methane diisocyanate, N,N',N''-tris(6-isocyanatohexamethylene)biuret, 1-chloro-2,4-diisocyanatobenzene, tris(4-isocyanatophenyl)methane, naphthalene diisocyanates, fluorene diisocyanates, bis(2-isocyanatoethyl)benzene, and prepolymers prepared therewith.

Other polyfunctional isocyanates which are useful in the compositions of the invention are disclosed in U.S. Pat. 3,162,664, of Brotherton et al., granted Dec. 22, 1964, U.S. Pat. 3,427,346, of Brotherton et al., granted Feb. 11, 1969, U.S. Pat. 3,275,679, of Brotherton et al., granted Sept. 27, 1966, U.S. Pat. 3,352,830, of Schmitt et al., granted Nov. 11, 1967, U.S. Pat. 2,729,666 of Stallmann, granted Jan. 3, 1956, U.S. Pat. 2,768,154 of Unruh et al., granted Oct. 23, 1956, U.S. Pat. 3,267,122 of Lehmann et al., granted Aug. 16, 1966, U.S. Pat. 3,281,378, of Garber et al., granted Oct. 25, 1066, U.S. Pat. 3,124,605, of Wagner, granted Mar. 10, 1964, U.S. Pat. 2,718,516 of Bortnick, granted Sept. 20, 1955, as well as isocyanates prepared from the amines disclosed in U.S. Pat. 3,256,318 of Brotherton et al., granted June 14, 1966.

Any of the foregoing and similar diisocyanates or polyisocyanates or prepolymers derived therefrom which have one or all of the —N=C=O groups blocked by reaction with blocking agents are useful. Suitable blocking agents include phenol, o-cresol, m-cresol, p-cresol, the xylenols, thiophenols, and the like, all as are well known. Representative examples are the adducts of phenol with 2,4-tolylene diisocyanate, phenol with 1,6-hexamethylene diisocyanate, m-cresol with 4,4-biphenyl diisocyanate, and the like. Any of the phenolic blocking agents can be reacted with any of the polyisocyanates.

In addition to the catalyst and the blocked isocyanate, the compositions of the invention comprise compounds which contain two or more active hydrogen atoms, preferably in hydroxyl groups, such as glycols, acrylic polyols, hydroxyl terminated polyesters, poly(oxyalkylene) glycols, castor oil, diamines, and poly(oxyalkylene) triols. Examples representative of useful polyols are diols such as propylene glycol, poly(oxypropylene) glycol having a molecular weight of between about 400 and 5000, and poly(oxypropylene)-poly(oxyethylene) glycols (block copolymers, which may be hydroxypropylene-terminated) having a molecular weight of from about 1000 to 3000; triols such as poly(oxypropylene) adducts of glycerin or trimethylolpropane or of trimethylolethane having a molecular weight of from 400 to 5000; polyvinyl alcohol, polymers and copolymers of hydroxyalkyl acrylates or methacrylates with other ethylenically unsaturated monomers, poly(oxypropylene)-poly(oxyethylene) adducts of trimethylolpropane having a molecular weight of 4000 to 5000; tetrols such as poly(oxypropylene) adducts of pentaerythritol having a molecular weight of 400 to 1000; and hexols such as the poly(oxypropylene) adducts of sorbitol, having a molecular weight of 500 to 5000, and the like.

Examples of nitrogen-containing compounds having active hydrogens, which are useful in preparing polyurethanes, polyureas, and the like are diamines such as ethylene diamine and phenylene diamine, amine-containing resins prepared by reacting dimerized fatty acids with ethylene diamine or diethylene triamine, and N,N'-bis(3-hydroxypropyl) oxamide.

Linear and branched chain polyhydroxy polyesters comprise another useful class of active hydrogen-containing compounds useful in carrying out the present invention. Glycols, triols, and hydroxy compounds of higher functionality may be reacted with dicarboxylic acids in preparing the polyesters, examples being the reaction products of adipic aicd, phthalic anhydride, dimer acid or mixtures thereof reacted with ethylene glycol, propylene glycol, diethylene glycol, dipropylene glycol, glycerol, trimethylolpropane, and mixtures thereof. Highly branched polyesters having high hydroxyl numbers are particularly useful for coatings. Although coatings have been mentioned, the compositions are also useful as adhesives and in other uses.

The preferred ratio, on an equivalents basis, of

—N=C=O/active-hydrogen is about 1/1, preferably about 0.75/1 to 1.5/1, although from 0.5/1 to 2/1 or an even wider range is useful. The catalyst is used in the amount of about 0.05 to 2%, preferably 0.1 to 1% on a metal basis by weight of the total polymer solids.

When the formulated compositions are liquid or spreadable, they may be used, for example, directly as coatings, without solvents or dispersants. When needed or desired, solvents or dispersants such as xylene, the "Cellosolve" ethers (methyl, ethyl, butyl, etc.) of ethylene glycol, ethyl acetate, butyl acetate, methylene chloride, acetone, chlorobenzene and the like are useful. Pigments, dyes, fluorescent dyes, fillers, antioxidants and antiozodants, stabilizers against the deteriorative effects of ultraviolet light, other compatible polymers, such as flow control agents, and other optional ingredients may be included in the compositions.

In use, the compositions are applied as coatings upon suitably cleaned or prepared substrates, such as metals, wood, paper, fabrics, or other materials. The products are then heated to curing temperatures until curing is complete. When solvents or dispersants are present, they may be evaporated at low temperatures followed by curing at higher temperatures. Ordinarily, the presence or absence of moisture is immaterial; in some cases, once the unblocking is accomplished, moisture takes a hand in curing the polymer. Curing temperatures are in the range of about 200 to 350° F., preferably 240 to 300° F.

EXAMPLE 1

This demonstrates that calcium octoate is equal to or better than dibutyl-tin di-2-ethylhexoate as a catalyst for the reaction between primary-OH containing polyester and an isocyanate.

| Formulations | 1 | 2 |
|---|---|---|
| Polyester [1] | 100 | 100 |
| Mondur S [2] (50% in ethyl acetate) | 89.4 | 89.4 |
| Calcium octoate (5% Ca plus metal) | 11.6 | |
| Dibutyl-tin di-2-ethylhexoate (50% in toluene) | | 5.0 |
| Santocel "L" [3] | 10.0 | 10.0 |

[1] Polyester of hydroxyl number 58 to 64 and acid number less than 2.0, prepared from 1.00 mole of adipic acid, 1.07 moles of diethylene glycol and 0.0505 mole of trimethylolpropane.
[2] Phenol blocked triisocyanate adduct of three toluene diisocyanate molecules reacted with one trimethylolpropane molecule; sold by Mobay Chemical Company under the name of Mondur S.
[3] Silica gel.

NOTE.—NCO/OH ratio in final mix is 1.20. Catalyst concentration—0.8% metal on polyester/Mondur S (solids on solids).

Application

Two coats were knife-coated onto nylon fabric and simultaneously dried and cured 5 minutes at 260, 280, or 300° F. after each coat.

Results

Hydrostatic resistance of coated fabrics after washing, and percent extraction of coating from fabric tumbled in DMF solvent, were used as a measure of crosslinking efficiency.

| Catalyst | Cure (minutes/° F.) | Hydrostatic resistance (lbs./sq. inch) | | Percent extraction of coating in DMF solvent |
| --- | --- | --- | --- | --- |
| | | After 3 washes | After 5 washes | |
| Ca octoate | 5/260 | 120 | 120 | 11 |
| | 5/280 | 120 | 120 | 8 |
| | 5/300 | 120 | 120 | 8 |
| Dibutyl-tin di-2-ethylhexoate | 5/260 | 120 | 120 | 19 |
| | 5/280 | 120 | 120 | 5 |
| | 5/300 | 120 | 120 | 43 |

Conclusion

Calcium octoate is a cheaper catalyst than dibutyl-tin di-2-ethylhexoate and equally effective for the reaction between primary-OH containing polyesters and a phenol blocked isocyanate.

EXAMPLE 2

Magnesium octoate is used to split or unblock the same blocked isocyanate as in Example 1 at a temperature of 280° F.

EXAMPLE 3

Calcium octoate is used similarly to the foregoing examples to unblock phenol blocked β-isocyanatoethyl-ε-isocyanato caproate.

Wherever a metal "octoate" is mentioned herein, the salt of 2-ethylhexanoic acid (also referred to as 2-ethylhexoic acid) is meant. Of course, the invention does include the use of salts of octanoic (caprylic) acid.

We claim:

1. In a process of reacting an isocyanate, blocked with phenolic groups and derived from an organic isocyanate having at least two —N=C=O groups, with a compound having at least two active hydrogen atoms to form a polyurethane or a polyurea, in which heat is utilized to accomplish the polymer-forming reaction, the improvement including in the mixture of the blocked isocyanate and active hydrogen-containing compound, in solution therewith, a carboxylic acid salt of calcium, strontium, magnesium, or barium, at least about 0.1 percent by weight of said salt being soluble in ethanol, acetone, ether, methylethyl ketone, or toluene, whereby the temperature required to accomplish said polymer-forming reaction is lowered, and heating the mixture to accomplish said reaction.

2. The process of claim 1 in which said salt is of calcium, and said active hydrogen-containing compound has hydroxyl groups.

3. The process of claim 2 in which said hydroxyl groups are primary hydroxyls, said salt is of a monocarboxylic alkenoic or alkanoic acid having from 3 to about 18 carbon atoms, inclusive, and said mixture is applied to a surface as a coating prior to said heating step.

4. The process of claim 1 in which said salt is of strontium, and said active hydrogen-containing compound has hydroxyl groups.

5. The process of claim 4 in which said active hydrogen-containing compound has primary hydroxyl groups, said salt is of a monocarboxylic alkenoic or alkanoic acid having from about 3 to about 18 carbon atoms, and said mixture is applied to a surface as a coating prior to said heating step.

6. A liquid composition curable by heat to a solid polyurethane or polyurea comprising:

(a) a blocked isocyanate derived from an isocyanate having at least two —N=C=O groups and a phenolic compound;

(b) a compound having at least two active hydrogen groups;

(c) an organo-soluble carboxylic acid salt of calcium, said ETAOI
strontium, magnesium, or barium in solution in said liquid, at least about 0.1 percent by weight of said salt being soluble in ethanol, acetone, ether, methylethyl ketone, or toluene.

7. The composition of claim 6 in which said salt is of calcium, and said active hydrogen-containing compound has hydroxyl groups.

8. The composition of claim 7 in which said active hydrogen-containing compound has primary hydroxy groups, and said salt is of a monocarboxylic alkenoic or alkanoic acid having from 3 to about 18 carbon atoms.

9. The composition of claim 6 in which said salt is of strontium, and said active hydrogen-containing compound has hydroxyl groups.

10. The composition of claim 9 in which said active hydrogen-containing compound has primary hydroxyl groups, and said salt is of a monocarboxylic alkenoic or alkanoic acid having from about 3 to about 18 carbon atoms.

11. The composition of claim 7 in which said active hydrogen-containing compound is a hydroxyl-containing polyester and said isocyanate is an adduct of trimethylolpropane and toluene diisocyanate.

12. The composition of claim 6 in which said carboxylic acid is an alkanoic acid having from 5 to 10 carbon atoms, inclusive.

13. The composition of claim 12 in which said carboxylic acid is 2-ethylhexoic acid.

14. The composition of claim 8 in which said salt is calcium octoate.

15. The composition of claim 10 in which said salt is calcium octoate.

References Cited

UNITED STATES PATENTS

| | | | |
| --- | --- | --- | --- |
| 3,108,975 | 10/1963 | Lambert et al. | 260—77.5 |
| 3,267,050 | 8/1966 | Kuryla et al. | 260—77.5 |
| 3,454,621 | 7/1969 | Engel | 260—77.5 |

DONALD E. CZAJA, Primary Examiner

E. C. RZUCIDLO, Assistant Examiner

U.S. Cl. X.R.

260—32.8 N, 33.2 R, 33.4 UR, 33.6 UB, 75 NB, 75 NT, 77.5 AB, 77.5 TB

UNITED STATES PATENT OFFICE
CERTIFICATE OF CORRECTION

Patent No. 3,705,119      Dated December 5, 1972

Inventor(s) Jerome F. Levy and John Kucsan

It is certified that error appears in the above-identified patent and that said Letters Patent are hereby corrected as shown below:

Column 1, line 35, delete ";" after "adducts"

Column 2, line 39, "hydroxyliso-" should read --hydroxyliso-cyanate reaction (Polyurethanes, Chem. and Techn. Part--

Column 3, line 21, "Oct. 25, 1066" should read --Oct. 25, 1966--

Column 5, line 10, "43" should read --3--

Column 6, line 13, delete "said ETA01"

Signed and sealed this 7th day of May 1974.

(SEAL)
Attest:

EDWARD M. FLETCHER, JR.      C. MARSHALL DANN
Attesting Officer      Commissioner of Patents